United States Patent
Metsäpelto et al.

(10) Patent No.: US 9,135,030 B2
(45) Date of Patent: Sep. 15, 2015

(54) METHOD, AN APPARATUS AND A COMPUTER PROGRAM PRODUCT FOR EXTENDING AN APPLICATION IN A CLIENT DEVICE

(75) Inventors: Ari Metsäpelto, Sastamala (FI); Timo Harju, Orivesi (FI); Antti Nivala, Pirkkala (FI); Juha Lepola, Tampere (FI)

(73) Assignee: M-FILES OY, Tampere (FI)

( * ) Notice: Subject to any disclaimer, the term of this patent is extended or adjusted under 35 U.S.C. 154(b) by 0 days.

(21) Appl. No.: 13/537,695

(22) Filed: Jun. 29, 2012

(65) Prior Publication Data

US 2014/0007262 A1    Jan. 2, 2014

(51) Int. Cl.
*H04L 29/06*    (2006.01)
*G06F 9/445*    (2006.01)

(52) U.S. Cl.
CPC .............. *G06F 9/44526* (2013.01); *G06F 8/67* (2013.01)

(58) Field of Classification Search
CPC . G06F 17/30126; G06F 9/44526; G06F 8/65; G06F 9/4443; H04L 9/3247
See application file for complete search history.

(56) References Cited

U.S. PATENT DOCUMENTS

| | | | | |
|---|---|---|---|---|
| 5,974,549 | A * | 10/1999 | Golan | 726/23 |
| 7,231,523 | B1 * | 6/2007 | Mathiske | 713/176 |
| 7,269,833 | B2 * | 9/2007 | Kushnirskiy | 719/328 |
| 7,512,661 | B1 * | 3/2009 | Phillips | 709/206 |
| 8,195,824 | B2 * | 6/2012 | Park et al. | 709/230 |
| 8,220,035 | B1 * | 7/2012 | Pravetz et al. | 726/5 |
| 8,667,480 | B1 * | 3/2014 | Sigurdsson et al. | 717/171 |
| 8,775,554 | B2 * | 7/2014 | Ozzie et al. | 709/217 |
| 2002/0183044 | A1 * | 12/2002 | Blackwell et al. | 455/412 |
| 2003/0079052 | A1 * | 4/2003 | Kushnirskiy | 709/328 |
| 2003/0119386 | A1 * | 6/2003 | Laux et al. | 439/894 |
| 2003/0126311 | A1 * | 7/2003 | Kushnirskiy et al. | 709/328 |
| 2005/0033728 | A1 * | 2/2005 | James et al. | 707/1 |
| 2005/0039197 | A1 * | 2/2005 | Ahmad et al. | 719/331 |
| 2005/0131971 | A1 * | 6/2005 | James et al. | 707/205 |
| 2005/0149213 | A1 * | 7/2005 | Guzak et al. | 700/94 |
| 2005/0289535 | A1 * | 12/2005 | Murray et al. | 717/172 |
| 2006/0069689 | A1 * | 3/2006 | Karklins et al. | 707/100 |
| 2006/0224544 | A1 * | 10/2006 | Keith, Jr. | 706/60 |
| 2006/0265508 | A1 * | 11/2006 | Angel et al. | 709/230 |

(Continued)

FOREIGN PATENT DOCUMENTS

EP    0810524 A1    12/1997

OTHER PUBLICATIONS

Explorer Extension, Liquidfolders (2009), available at http://liquidfolders.net/explorer/en/.*

(Continued)

*Primary Examiner* — Taghi Arani
*Assistant Examiner* — Sharon Lynch
(74) *Attorney, Agent, or Firm* — Ware, Fressola, Maguire & Barber LLP

(57) ABSTRACT

The invention relates to a method for extending an application in a client device. The method comprises forming a connection from the client device to a server in order to access a document vault in the server; receiving one or more extension elements from the document vault wherein said one or more extension elements comprise software logic; executing the software logic in said client device in order to adapt a document management application as an extension of a file management system of the client device according to the one or more extension elements.

15 Claims, 2 Drawing Sheets

(56) References Cited

U.S. PATENT DOCUMENTS

| | | | |
|---|---|---|---|
| 2007/0043700 A1* | 2/2007 | Dawson et al. | 707/3 |
| 2007/0055936 A1* | 3/2007 | Dhanjal et al. | 715/700 |
| 2008/0134162 A1* | 6/2008 | James et al. | 717/168 |
| 2008/0288301 A1* | 11/2008 | Emling et al. | 705/4 |
| 2009/0254912 A1* | 10/2009 | Roundtree et al. | 718/102 |
| 2009/0282477 A1* | 11/2009 | Chen et al. | 726/22 |
| 2010/0005476 A1 | 1/2010 | Jayet et al. | |
| 2010/0057808 A1* | 3/2010 | DeVorchik et al. | 707/741 |
| 2010/0118038 A1* | 5/2010 | Labour et al. | 345/522 |
| 2010/0118039 A1* | 5/2010 | Labour | 345/522 |
| 2010/0122271 A1 | 5/2010 | Labour et al. | |
| 2010/0318609 A1* | 12/2010 | Lahiri et al. | 709/205 |
| 2011/0252018 A1* | 10/2011 | Bhose et al. | 707/711 |
| 2011/0296322 A1* | 12/2011 | Dhanjal et al. | 715/760 |
| 2012/0064976 A1* | 3/2012 | Gault et al. | 463/42 |
| 2012/0089920 A1* | 4/2012 | Eick | 715/739 |
| 2012/0102485 A1* | 4/2012 | Goldman | 717/176 |
| 2012/0117609 A1 | 5/2012 | Dalzell et al. | |
| 2013/0024854 A1* | 1/2013 | Kumagai | 717/174 |
| 2013/0055369 A1* | 2/2013 | Kumar et al. | 726/7 |
| 2013/0067454 A1* | 3/2013 | Thompson et al. | 717/173 |
| 2013/0166697 A1* | 6/2013 | Manning | 709/219 |

OTHER PUBLICATIONS

What's Tabbles?, Tabbles (WaybackMachine dated May 28, 2012), available at http://tabbles.net/what-is-it/whats-tabbles/.*
Shell Extensions map and key features of Shell+, Shell plus (WaybackMachine dated Aug. 31, 2011), available at http://www.shellplus.com/shell-extensions-map.html.*
Understanding Shell Namespace Extensions, Windows (WaybackMachine dated Dec. 2011), available at http://msdn.microsoft.com/en-us/library/windows/desktop/cc144095(v=vs.85).aspx.*
Rensin, Dave, Create Namespace Extensions for Windows Explorer with the .NET Framework, MSDN Magazine (Jan. 2004), available at http://msdn.microsoft.com/en-us/magazine/cc188741.aspx.*

* cited by examiner

METHOD, AN APPARATUS AND A COMPUTER PROGRAM PRODUCT FOR EXTENDING AN APPLICATION IN A CLIENT DEVICE

FIELD OF THE INVENTION

The present invention relates to a solution for extending an application in a client device.

BACKGROUND OF THE INVENTION

Software functionalities can be extended or adapted with other software or software modules. Application Programming Interface (API) is a technique by means of which software can be used by programs instead of using the software by a user through a user interface. Add-in, plug-in, snap-in and extension are examples of components by means of which application functionalities can be adapted. Such a component usually comprises program logic. The program logic is incorporated to the target application, whereby the logic can utilize the application programming interface in order to achieve the adaptation of the functionality of the target application.

"Microsoft Windows™" is an operating system that has a file management system, including a user interface, as part of the operating system. The Windows file management system operates in "Windows Explorer" application, but it may also operate in other applications that run on the operating system if they need file management features. The Windows file management system comprises the "Windows Explorer" application ("Explorer.exe") and other program modules, such as dynamic link libraries (DLLs), one of which is called "Shell32.dll" in several versions of the Windows operating system. One or more of these program modules may also operate in other applications that run on the operating system if the application(s) need file management features. For example, relevant parts of the Windows file management system operate in word processing applications (e.g., "Microsoft Word", "Apache OpenOffice Writer") and other types of applications, some of which are part of the Windows operating system and some of which are installed on top of the operating system, providing such applications with commonly needed functionality such as a user interface for opening files and saving files from a file system.

The Windows file management system is mainly targeted to generic management of files' presence and physical location. The Windows file management system can be adapted according to use situations (e.g., for browsing images or music files), but such an adaptation is carried out by built-in functionality of Windows. This means that the file management functionality is not adapted according to the content in a way that deviates from the way the operating system has been initially programmed. The Windows file management system can also be adapted beyond the built-in functionality of Windows with a Shell Namespace Extension technique (a technique by Microsoft). When the Windows file management system is adapted with the Shell Namespace Extension technique, the extensions of the file management system are installed to a local computer. Such extensions (shell namespace extensions) are program modules, typically dynamic link libraries (DLLs). The extension can thus be used constantly regardless of the use situation. In addition, the extension is usable according to rules that have been programmed to the extension itself. This means that any change to the extension functionality need to be installed separately to each client device.

The generic Windows file management system functionality cannot be extended exclusively by binding it to a certain purpose of use, and the extension needs to be very discrete in order not to disturb other purposes of use of the file management. For this and other reasons well known among professionals familiar with the Windows file management system, the creation of shell namespace extensions requires special programming skills and is time-consuming, making the shell namespace extension technique in its traditional form unsuitable or undesirable if the Windows file management system needs to be adapted to several different, limited purposes of use.

SUMMARY OF THE INVENTION

Now there has been invented an improved method and technical equipment implementing the method, by which a document management application of a client device, which document management application is based on Shell Namespace Extension, can be specialized according to different purposes. Various aspects of the invention include a method, a client device, and a computer readable medium comprising a computer program stored therein, which are characterized by what is stated in the independent claims. Various embodiments of the invention are disclosed in the dependent claims.

According to a first aspect, a method for extending an application in a client device, comprises forming a connection from the client device to a server in order to access a document vault in the server; receiving one or more extension elements from the document vault, wherein said one or more extension elements comprise software logic; executing the software logic in said client device in order to adapt a document management application of the client device according to said one or more extension elements.

According to a second aspect, a client device comprises a processor, memory including computer program code, the memory and the computer program code configured to, with the processor, cause the client device to perform at least the following: forming a connection to a server in order to access a document vault in the server; receiving one or more extension elements from the document vault, wherein said one or more extension elements comprise software logic; executing the software logic in said client device in order to adapt a document management application according to said one or more extension elements.

According to a third aspect, a computer program product comprises a computer-readable medium bearing computer program code embodied therein for use with a computer, the computer program code comprising: code for forming a connection from a client device to a server in order to access a document vault in the server; code for receiving one or more extension elements from the document vault, wherein said one or more extension elements comprise software logic; code for executing the software logic in said client device in order to adapt a document management application of the client device according to said one or more extension elements.

According to an embodiment, the adapting of the document management application comprises affecting a part of the document management application that is an extension of a file management system of the operating system of the apparatus.

According to an embodiment, a user interface of the document management application is adapted according to the one or more extension elements.

According to an embodiment, the adaptation of the document management application is maintained as long as the client device is using the document vault.

According to an embodiment, the client device is capable of accessing more than one document vault, wherein at least two of the document vaults comprise individual extension elements, whereby a document management application of the client device is adapted according to one or more extension elements of such document vault, which the client device is at that point accessing.

According to an embodiment, a user of the client device is requested for a permission to execute the software logic in said client device.

According to an embodiment, an extension element further comprises a digital signature authenticating the origin of the extension element.

DESCRIPTION OF THE DRAWINGS

In the following, various embodiments of the invention will be described in more detail with reference to the appended drawings, in which.

DETAILED DESCRIPTION OF THE EMBODIMENTS

In the following, several embodiments of the invention will be described in the context of document management system such as applicant's M-Files®. It is to be noted, however, that the invention is not limited to such a document management system. In fact, the different embodiments have applications widely in any client-server environment where client software is based on Shell Namespace Extension. However, in the following, term "document management system" relates to data management system, content management system, enterprise content management system, where M-Files® is an example. The document management system is integrated to Windows by means of Shell Namespace Extension. This means that the content of the document management system is displayed as part of the Windows file management system.

The purpose of the present embodiments is to adapt the functionality of the document management system by extending the functionality of the Windows file management system in such a manner that the Shell Namespace Extension of the client software for the document management system can be tailored according to any situation where files and documents of the document management system are used.

Figure 1:
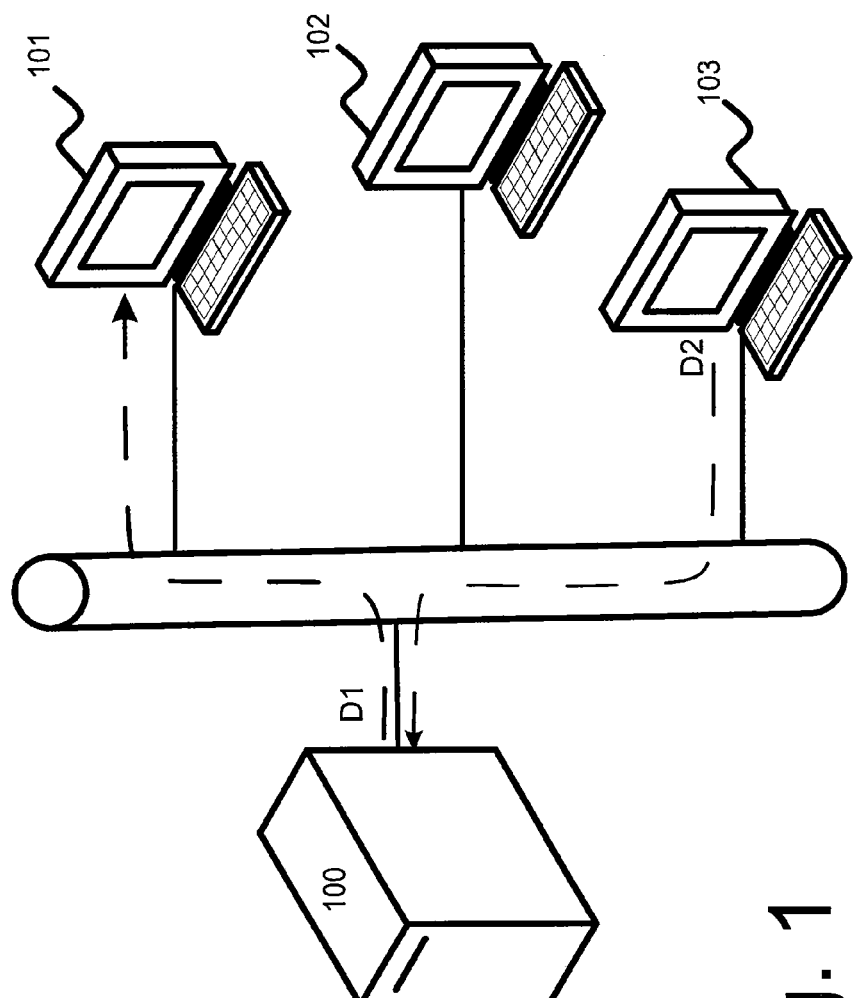
FIG. 1 shows an example of a document management system.

FIG. 1 illustrates a simplified example of a document management system. The system comprises at least one server 100 configured to store documents and files. The server 100 may have different document vaults (i.e. document storages) for different purposes. The document management system also comprises one or more client devices 101, 102, 103 that have an access to the server 100 and to the documents stored therein. In Figure's 1 example, a client device 101 retrieves a document D1 from the server 100, whereby a client device 103 stores a document D2 to the server. Each of the client devices 101, 102, 103 comprises a client software that provides a view to the content of the server 100. The client software of the document management system comprises a Shell Namespace Extension, whereby the view to the document management system's content is visualized according to the operating system of the client device.

In the following, a solution for extending (i.e. adapting) such a client software of the document management system is described. The adaptation may take effect only when needed, whereby the adaptation can be performed to serve only a limited purpose of use. By this, a remarkable improvement can be achieved to the user experience on document and content management. This is because instead of or in addition to the generic functions, it is possible to perform independently designed function for each use.

Let us clarify this by an example. Generic file management in Windows is able to provide generic functions such as Add file or Delete file to the user. When a client software of a document management system extends the Windows file management system with a Shell Namespace Extension towards generic document management, then the client software resembles the generic file management system, providing functions such as Add document, Delete document, Add file to multi-file document, Check out, Check in.

A client software of a document management system that is further adapted, on the other hand, can provide tailored functions for different industries or purposes. As an example, a content management system for Human Resources can provide functions such as Hire an employee or Fire an employee, and may leave out the generic file management functions. As another example, a file management system for health care can provide an additional function such as Diagnose an X-ray image. By means of traditional methods, dynamic extension of a Shell Namespace Extension based client software of a document management system for specific purposes has not been possible.

The present embodiments provide a solution, by means of which Shell Namespace Extensions in a document management system can be extended further for specific purposes in a context-aware manner. This can be achieved by storing client software extensions with the stored documents in the document vault that resides in the document management system's server. The content of the document vault can be used through Windows file management, apparently as a part of the Windows file management system, by means of document management system's client software and client software extension(s). When a client software is used by the client device for browsing the document vault, the extension elements concerning this document vault are transmitted to the client software and taken into use according to the present embodiments. In other words, the program logic such as programming instructions that are incorporated in the extension elements are stored in document vaults being located in the server, but they are executed on the client software while the client software is using the document vault storing the extension elements.

In an embodiment, the user interface of the client software is implemented as extension of the Windows Explorer application (and of other applications using the Windows file management system), whereby the Windows file management system becomes adapted in an industry-specific manner when the documents/files are accessed from the document vault relating to the industry in question of the document management system.

Technically the client software for the document management system can be implemented inter alia by Windows Shell Namespace Extension technique, and it also adapts the Windows file management system when document vaults of the document management system are used via the Windows file management system. The extension elements originating from the document vaults are configured to extend the Shell Namespace Extension component's operation even further. Therefore the embodiments of the present solution particularly relate to extending constantly installed extension element dynamically according to used document vault.

Figure 2:
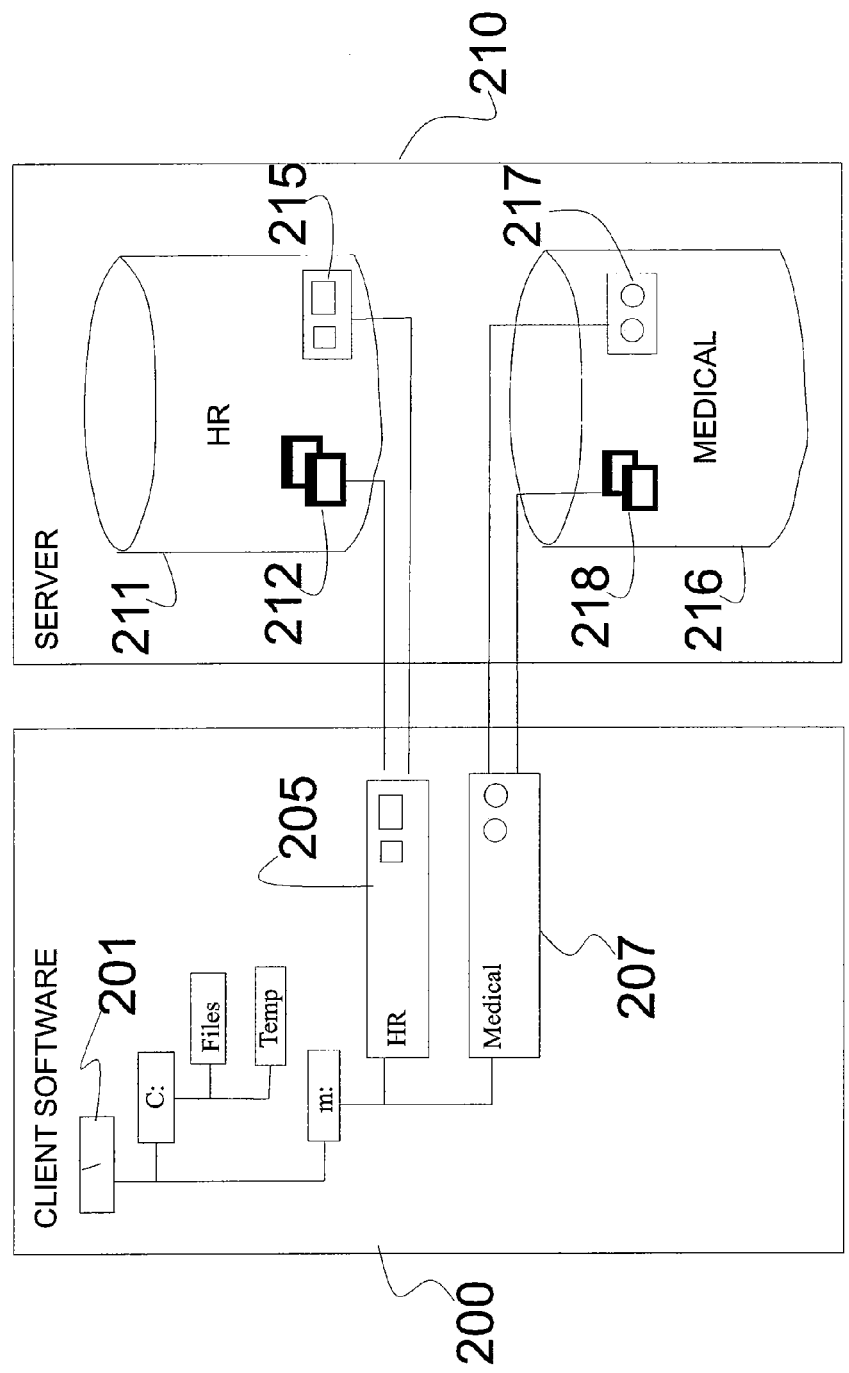
FIG. 2 shows an example of the present embodiment.

FIG. 2 illustrates an example of an embodiment. A server 210 stores two document vaults 211, 216, which in this example are a document vault for human resources (HR) 211 and a medical document vault 216. Both document vaults 211, 216 store documents 212, 218 and extension elements 215, 217 for a client software 200. The client software 200 has a file management system (e.g. Windows) 201 that comprises structures 205, 207 reflecting the content of the server. Each of these structures 205, 207 corresponds to a certain document vault 211, 216 in the server 210. In addition, each of these structures 205, 207 provides an access to the data in the corresponding document vault 211, 216. It can be realized from FIG. 2 that the structures 205, 207 comprise data from the extension elements 215, 217 respectively. The extension elements 215, 217 have been transferred to the client software 200 to put them into force in the client software. It is to be noted that these extension elements are utilized only when the client software executes the content of such document vault where the extension element is originated.

FIG. 2 shows that extension elements 215, 217 are different from each other in that they are vault-specific (extension element 215 in the Human Resources vault 211 and extension element 217 in the Medical vault 216). FIG. 2 clearly shows that the structure 205, 207 that provides access to a document vault 211, 216 respectively obtains vault-specific extension elements 215, 217 to and from the document vault 211, 216 to which the access is formed.

The extension elements may customize user interface specific issues of the client software, such as adding/deleting/modifying commands, changing colors, creating event handlers etc. As a process, the customization is performed by running the software logic of the extension element in the client, i.e., by executing programming-language instructions that are incorporated in the extension elements. The extension elements may be provided as add-in components that extend the operation of the client software.

In the previous embodiment, the extension elements are stored in the document vault on the server. This makes the extension elements easier to deliver, install, update and maintain for the client software. In addition, it makes it sure to the server that the extension elements are really used in the client software. Additionally, it makes the management of the content and the associated extension elements easier for system administrators, because the extension elements are stored together with the content in the document vault on the server, thus making the extension elements included in backups of the document vault, relieving the system administrators from the task of applying additional backup procedures for extension elements. Also, moving or copying the content and the associated extension elements from one server to another becomes easier. It is appreciated that the extension elements can also be stored in the client device. However, in such a case, each of the extension elements need to be separately updated and maintained, which abates the afore mentioned advantages. The extension elements can also be stored on the server, but outside of the document vault (i.e., without being considered to be part of the document vault's overall content that is stored on the server). However, in such case, some of the afore mentioned advantages are not achieved.

Storing extension elements in a document vault on a server, transferring the extension elements from the server to the client, and adapting the behavior of the client software by executing programming instructions incorporated in the extension elements creates additional challenges that are not present in the traditional solutions in which users or system administrators explicitly install software applications or extensions to local computers. One of the challenges is related to the security of the local computers. Users of a document management system typically allow a client application of a document management system to run on the user's local computer. Such permission is implicitly given by the user by installing the client application. However, it is not desirable that such permission would enable also other software modules, potentially created by different vendors or persons, to execute on the user's computer.

The challenge is even bigger in a document management system in which the client software comprises a Shell Namespace Extension, because Shell Namespace Extensions can potentially be executed inside the process of any application that the user has installed on the local computer. As a consequence, any extension elements that the document management system uses to adapt the client software for a specific purpose can also potentially be executed in any application, which creates a security risk because the extension elements on the server could be created by arbitrary vendors or persons not trusted by the user of the local computer. This operating environment differs from the operating environment of those traditional document management systems the user interface of which is based on a separate dedicated application of the document management system, instead of being based on a Shell Namespace Extension that extends the Windows file management system as in the present embodiment. From the security point of view, a user interface that is based on a separate dedicated application is easier to extend and adapt because the execution environment of such an application is well known and can be fully controlled by the document management system. Also, the described operating environment of the present embodiment differs from other traditional document management systems that are Web-based, i.e., that are accessed by the user with a Web browser. A Web browser is similar to a separate, dedicated application in that it provides an isolated and optionally restricted or "sandboxed" execution environment, making it easier to extend and adapt the user interface without introducing security risks for the user. However, these alternative approaches cannot provide the same level of integration with the Windows file management system as a Shell Namespace Extension based document management system can, making it desirable to develop means that enable the safe use of extension elements in a client software that is based on a Shell Namespace Extension.

In an embodiment, the above described security challenges are solved by utilizing cryptographic algorithms for calculating, on a server, a hash (or "signature") of the extension elements that incorporate programming instructions; encrypting the hash with the private key of a security certificate issued by an organization that the user is assumed to trust; associating the resulting "digital signature" with the extension element; and utilizing a public key on a client computer to present the user with verified information on the identity of the party that created the extension or made it available in the document vault. The user is then presented a prompt dialog with a user interface for accepting or rejecting the corresponding extension element. The methods of digitally signing content are well known in the art, and thus the process of digitally signing extension elements is not described in detail.

If security requirements are less strict, the use of digital signatures can be skipped, and the user of the client application can be presented with a simple question of if the user allows an extension element to run on the user's computer. While this approach protects the user against the execution of arbitrary extension elements without the user's consent, it is not sufficient in many practical use cases because the user does not have reasonable basis for deciding which extension elements to allow to be executed and which not. This easily leads to the user either rejecting all extension elements (even the safe and necessary ones), or accepting all extension elements (even the unknown and risky ones). Because of this, the use of digitally signed extension elements is desirable.

Further, in an embodiment, security risks are mitigated by providing a separate, restricted execution environment ("sandbox") for executing code incorporated in the extension elements. The sandbox can comprise one or more additional processes created by the document management system on the local computer. The client software of the document management system can ensure that any code incorporated in the extension elements that could pose security risks if executed in the default execution environment, is executed in the "sandbox". Or, the client software can execute all code incorporated in the extension elements in the "sandbox". Code executing in such a "sandbox" can communicate with the default execution environment of the Shell Namespace Extension by means of inter-process communication, such as Component Object Model (COM), named pipes, or sockets.

The extension elements can extend the functionality of the Shell Namespace Extension implemented by the document management system, but also the functionality of the client software of the document management system overall. The extension elements can also extend the functionality of all such applications that are using the Windows file management system through so called "Common Dialogs" views.

The previous description uses examples where Windows is the operating system and the technique for making operating system related extensions for software is Shell Namespace Extension. However, the present embodiments may be utilized in other operating systems and their extension techniques as well.

The various embodiments of the invention can be implemented with the help of computer program code that resides in a memory and causes the relevant apparatuses to carry out the invention. For example, a client device may comprise circuitry and electronics for handling, receiving and transmitting data, computer program code in a memory, and a processor that, when running the computer program code, causes the client device to carry out the features of an embodiment. Yet further, a server device may comprise circuitry and electronics for handling, receiving and transmitting data, computer program code in a memory, and a processor that, when running the computer program code, causes the server device to carry out the features of an embodiment.

It is obvious that the present invention is not limited solely to the above-presented embodiments, but it can be modified within the scope of the appended claims.

The invention claimed is:

1. A method for further extending an application in a client device, the method comprising:
 forming a connection from the client device to a server, wherein the server comprises one or more document vaults, each document vault comprising content for the application and vault-specific extension elements, wherein said application is a document management application of an operating system of the client device, which document management application has been extended with shell namespace extension elements;
 accessing specific content from a document vault of the one or more document vaults in the server by the client device;
 receiving one or more encrypted or hashed vault-specific extension elements from the accessed document vault, which vault-specific extension elements are not permanently stored on the client device and are configured to further extend the shell namespace extension elements in said client device dynamically and wherein said one or more vault-specific extension elements comprise software logic;
 verifying the vault-specific extension elements on the client device; and
 executing the software logic in said client device in order to adapt the shell namespace extension elements of the document management application in the client device according to said one or more received vault-specific extension elements, wherein the software logic is executed as long as the client device continues to access the specific content from the accessed document vault.

2. The method according to claim 1, wherein the adapting of the document management application comprises adapting a part of the document management application.

3. The method according to claim 1, further comprising adapting a user interface of the document management application according to the one or more vault-specific extension elements.

4. The method according to claim 1, wherein the client device is capable of accessing more than one document vault, wherein at least two of the one or more document vaults comprise individual vault-specific extension elements, wherein the document management application of the client device is adapted according to one or more vault-specific extension elements of the document vault to which the client device has current access at that moment.

5. The method according to claim 1, wherein the verifying the vault-specific extension elements on the client device comprises requesting from a user of the client device a permission to execute the software logic from said vault-specific extension elements in said client device.

6. The method according to claim 1, wherein verifying the vault-specific extension elements on the client device comprises receiving a digital signature with the one or more vault-specific extension elements, wherein the digital signature authenticates an origin of the vault-specific extension elements.

7. A client device comprising a processor, memory including computer program code and an application, the memory and the computer program code configured to, with the processor, cause the client device to perform at least the following:
 forming a connection to a server, wherein the server comprises one or more document vaults, each document vault comprising content for the application and vault-specific extension elements wherein said application is an document management application of an operating system of the client device, which document management application has been extended with shell namespace extension elements;
 accessing specific content from a document vault of the one or more document vaults in the server by the client device;
 receiving one or more encrypted or hashed vault-specific extension elements from the accessed document vault, which vault-specific extension elements are not permanently stored on the client device and are configured to further extend the shell namespace extension elements in said client device dynamically, wherein said one or more vault-specific extension elements comprise software logic; and
 verifying the vault-specific extension elements on the client device; and executing the software logic in said client device in order to adapt the shell namespace extension elements of the document management application in the client device according to said one or more received vault-specific extension elements, wherein the software logic is executed as long as the client device continues to access to the specific content from the accessed document vault.

8. The client device according to claim 7, wherein the adapting of the document management application comprises adapting a part of the document management application.

9. The client device according to claim 7, further comprising computer program code configured to, with the processor, cause the client device to perform at least the following:
adapting a user interface of the document management application according to the one or more vault-specific extension elements.

10. The client device according to claim 7, wherein the client device is capable of accessing more than one document vault, wherein at least two of the one or more document vaults comprise individual vault-specific extension elements, wherein the document management application of the client device is adapted according to one or more vault-specific extension elements of the document vault to which the client device has current access.

11. The client device according to claim 7, wherein the verifying the vault-specific extension elements on the client device comprises
receiving a permission from a user to execute the software logic from said vault-specific extension elements in said client device.

12. The client device according to claim 7, wherein verifying the vault-specific extension elements on the client device comprises receiving a digital signature with the one or more vault-specific extension elements, wherein the digital signature authenticates an origin of the vault-specific extension elements.

13. A computer program product comprising a computer-readable non-transitory medium bearing computer program code embodied therein for use with a computer, the computer program code comprising:

code for forming a connection from a client device to a server, wherein the server comprises one or more document vaults, each document vault comprising content for the document management application and vault-specific extension elements, wherein said client device comprises an application, wherein said application is a document management application of an operating system of the client device, which application has been extended with shell namespace extension elements;

code for accessing specific content from a document vault of the one or more document vaults in the server by the client device;

code for receiving one or more encrypted or hashed vault-specific extension elements from the accessed document vault, which vault-specific extension elements are not permanently stored on the client device and are configured to further extend the shell namespace extension elements in said client device dynamically and wherein said one or more vault-specific extension elements comprise software logic;

code for verifying the vault-specific extension elements on the client device; and code for executing the software logic in said client device in order to adapt the shell namespace extension elements of the document management application in the client device according to said one or more received vault-specific extension elements, wherein the software logic is executed as long as the client device continues to access the specific content from the accessed document vault.

14. The computer program product according to claim 13, wherein the adapting of the document management application comprises a part of the document management application.

15. The computer program product according to claim 13, wherein a vault-specific extension element of the vault-specific extension elements further comprises a digital signature authenticating origin of the vault-specific extension element.

* * * * *